(12) United States Patent
Yan et al.

(10) Patent No.: US 12,542,896 B2
(45) Date of Patent: Feb. 3, 2026

(54) GEOMETRY PARTITIONING FOR AFFINE MOTION COMPENSATED PREDICTION IN VIDEO CODING

(71) Applicant: BEIJING DAJIA INTERNET INFORMATION TECHNOLOGY CO., LTD., Beijing (CN)

(72) Inventors: Ning Yan, Beijing (CN); Xiaoyu Xiu, San Diego, CA (US); Che-Wei Kuo, Beijing (CN); Wei Chen, San Diego, CA (US); Yi-Wen Chen, San Diego, CA (US); Hong-Jheng Jhu, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 81 days.

(21) Appl. No.: 18/406,935

(22) Filed: Jan. 8, 2024

(65) Prior Publication Data
US 2024/0171735 A1 May 23, 2024

Related U.S. Application Data

(63) Continuation of application No. PCT/US2022/033549, filed on Jun. 15, 2022.
(Continued)

(51) Int. Cl.
*H04N 19/109* (2014.01)
*H04N 19/119* (2014.01)
(Continued)

(52) U.S. Cl.
CPC ......... *H04N 19/109* (2014.11); *H04N 19/119* (2014.11); *H04N 19/176* (2014.11); *H04N 19/51* (2014.11); *H04N 19/70* (2014.11)

(58) Field of Classification Search
CPC .. H04N 19/109; H04N 19/119; H04N 19/176; H04N 19/51; H04N 19/70; H04N 19/52; H04N 19/54
See application file for complete search history.

(56) References Cited

U.S. PATENT DOCUMENTS

2021/0058617 A1    2/2021  Reuze et al.
2022/0321890 A1*  10/2022  Lim ..................... H04N 19/137
2022/0329822 A1*  10/2022  Chang ................... H04N 19/46

FOREIGN PATENT DOCUMENTS

KR    20210011898 A    2/2021
WO    2020094049 A1    5/2020
(Continued)

OTHER PUBLICATIONS

Bross B et al: "Versatile Video Coding (Draft 10)", 19. JVET Meeting; Jun. 22, 2020-Jul. 1, 2020; Teleconference; (The Joint Video Exploration Team of ISO/IEC JTC1/SC29/WG11 and ITU-T SG.16 ), No. JVET-S2001 Sep. 4, 2020 (Sep. 4, 2020), XP030289618, 546 pages.
(Continued)

*Primary Examiner* — Richard T Torrente
(74) *Attorney, Agent, or Firm* — Bayes PLLC

(57) ABSTRACT

Implementations of the disclosure provide systems and methods for motion compensation prediction. The method may include performing, by a video processor, a geometry partition on a video block of a video frame from a video to obtain a first partition and a second partition. The method may further include applying, by the video processor, a first motion prediction mode to the first partition and a second motion prediction mode to the second partition. At least one of the first motion prediction mode or the second motion prediction mode is an affine motion prediction mode.

12 Claims, 14 Drawing Sheets

Related U.S. Application Data

(60) Provisional application No. 63/218,532, filed on Jul. 6, 2021.

(51) Int. Cl.
  *H04N 19/176* (2014.01)
  *H04N 19/51* (2014.01)
  *H04N 19/70* (2014.01)

(56) References Cited

FOREIGN PATENT DOCUMENTS

| | | |
|---|---|---|
| WO | 2021122416 A1 | 6/2021 |
| WO | 2022221013 A1 | 10/2022 |

OTHER PUBLICATIONS

International Search Report and Written Opinion in related PCT Application No. PCT/US22/33549 dated Sep. 28, 2022 (9 pages).
Han Gao et al., Geometric Partitioning Mode in Versatile Video Coding: Algorithm Review and Analysis, IEEE Transactions on Circuits and Systems for Video Technology, vol. 31, Issue 9, Nov. 2020 (15 pages).
Jianle Chen et al., Algorithm Description for Versatile Video Coding and Test Model 11 (VTM 11), [Document JVET-T2002-v2 (version 5)], Joint Video Experts Team (JVET) of ITU-T SG 16 WP 3 and ISO/IEC JTC 1/SC 29, Jan. 2021 (101 pages).
Krit Panusopone et al., Geometric Partitioning Merge Mode with Motion Vector Refinement, 2020 IEEE 22nd International Workshop on Multimedia Signal Processing (MMSP), Sep. 2020 (6 pages).

* cited by examiner

GEOMETRY PARTITIONING FOR AFFINE MOTION COMPENSATED PREDICTION IN VIDEO CODING

CROSS-REFERENCE TO RELATED APPLICATION

This application is a continuation application of PCT application No. PCT/US2022/033549 filed on Jun. 15, 2022, which is based upon and claims priority to U.S. Provisional Application No. 63/218,532 filed Jul. 6, 2021, the content thereof is incorporated herein by reference in its entirety for all purposes.

TECHNICAL FIELD

This application is related to video coding and compression. More specifically, this application relates to video coding systems and methods for motion refinement.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video coding method for motion compensation prediction. The video coding method may include performing, by a processor, a geometry partition on a video block of a video frame from a video to obtain a first partition and a second partition. The method may further include applying, by the processor, a first motion prediction mode to the first partition and a second motion prediction mode to the second partition. At least one of the first motion prediction mode or the second motion prediction mode is an affine motion prediction mode.

Implementations of the present disclosure also provide a video coding apparatus for motion compensation prediction. The video coding system may include a memory and a video processor. The memory may be configured to store at least one video frame of a video. The video frame includes at least one video block. The video processor may be configured to perform a geometry partition on a video block of a video frame from the video to obtain a first partition and a second partition. The video processor may be further configured to apply a first motion prediction mode to the first partition and a second motion prediction mode to the second partition. At least one of the first motion prediction mode or the second motion prediction mode is an affine motion prediction mode.

Implementations of the present disclosure also provide a non-transitory computer-readable storage medium having stored therein instructions which, when executed by a video processor, cause the video processor to perform a video coding method for motion compensation prediction. The video coding method may include performing a geometry partition on a video block of a video frame from the video to obtain a first partition and a second partition. The method may further include applying a first motion prediction mode to the first partition and a second motion prediction mode to the second partition to obtain a coded video block. At least one of the first motion prediction mode or the second motion prediction mode is an affine motion prediction mode. The method may also include generating a bitstream including the coded video block. The bitstream is stored in the non-transitory computer-readable storage medium.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
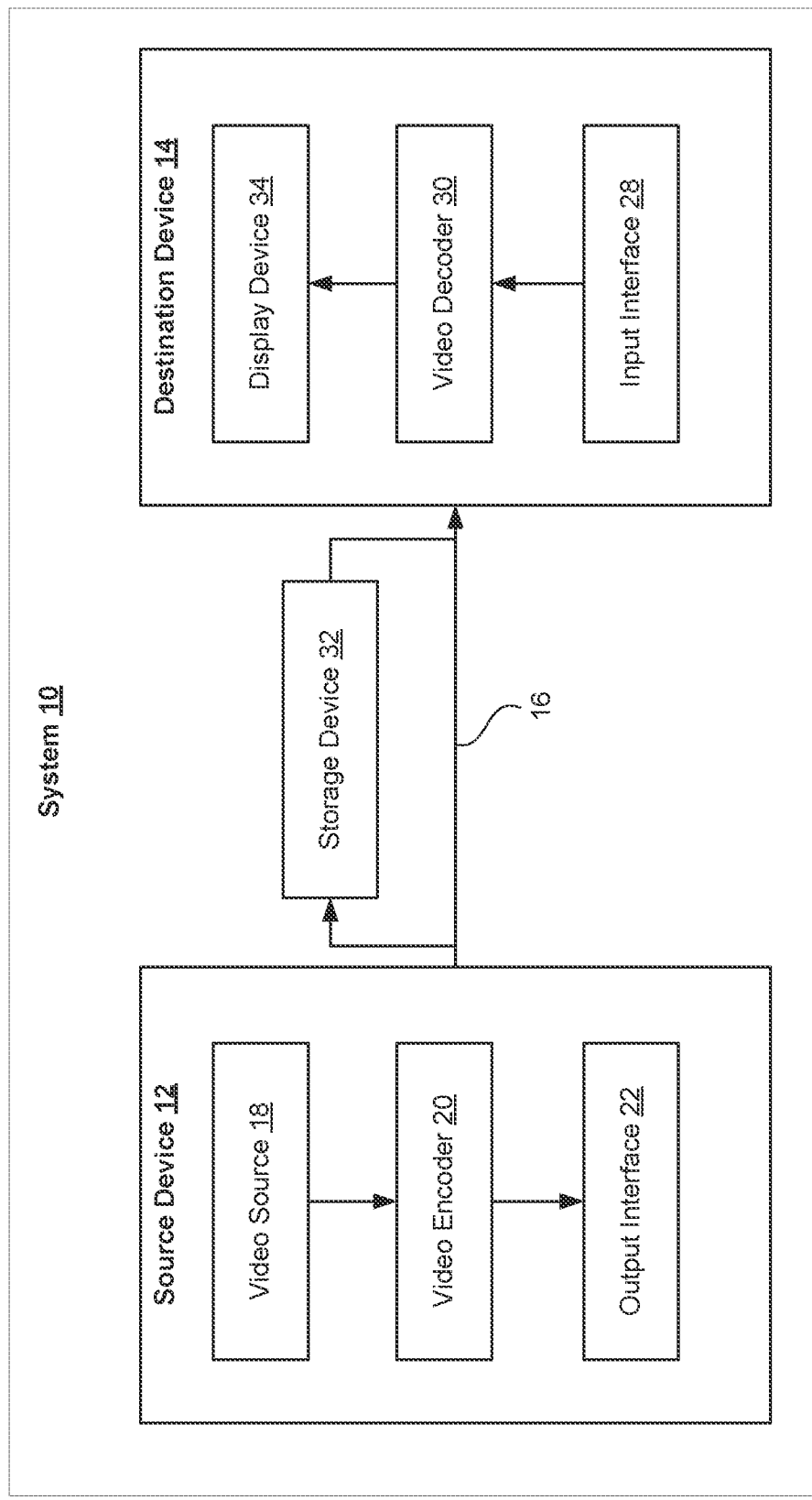
FIG. 1 is a block diagram illustrating an exemplary system for encoding and decoding video blocks in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

In the current VVC standard, affine motion compensated prediction is adopted to deal with high-order motion characteristics. Various tools are introduced into VVC to improve the coding efficiency of inter prediction. For example, to improve the coding efficiency of motion vector, coding tools, like history-based MVP (HMVP) and adaptive motion vector resolution (AMVR) are incorporated. To improve the accuracy of motion compensation, several coding tools are introduced into VVC, e.g., affine motion compensation, geometry partitioning are introduced, bi-prediction with coding unit (CU)-level weight (BCW) and so on. In the current design, affine motion compensated prediction is only applied to rectangular blocks. However, in practice the moving objects may have irregular shape, which makes the current affine mode less effective. For example, it is often the case that the moving objects are with irregular shape and it will cost a lot of bits to capture it using rectangular block partition.

Consistent with the present disclosure, a video coding system and method are disclosed herein to improve the coding efficiency of affine motion compensated prediction used in both the VVC and AVS3 standards. The disclosed system and method introduce geometry partitioning mode (GPM) into affine prediction mode. Geometry partitioning is introduced to handle the moving objects with irregular shape. Besides, affine motion compensated prediction is adopted to deal with the objects with high-order motion. Accordingly, the system and method disclosed herein can combine affine motion compensated prediction and geometry partition to capture the high-order motion characteristics of objects with irregular shape.

Consistent with the present disclosure, a CU can be further partitioned into two partitions by a geometrically located line. Each partitions in the CU can be coded using different coding modes or the same coding mode with different parameters. The disclosure provides several typical examples to combine affine mode and geometry partitioning.

Consistent with the present disclosure, a geometry partition based affine mode can be used as an exemplary implementation of a motion prediction mode to facilitate the description of the present disclosure. It is contemplated that the system and method disclosed herein can also apply a different design of affine motion prediction mode or other coding tools with the same or similar design spirit. Such technical solutions are also within the scope of the present application.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
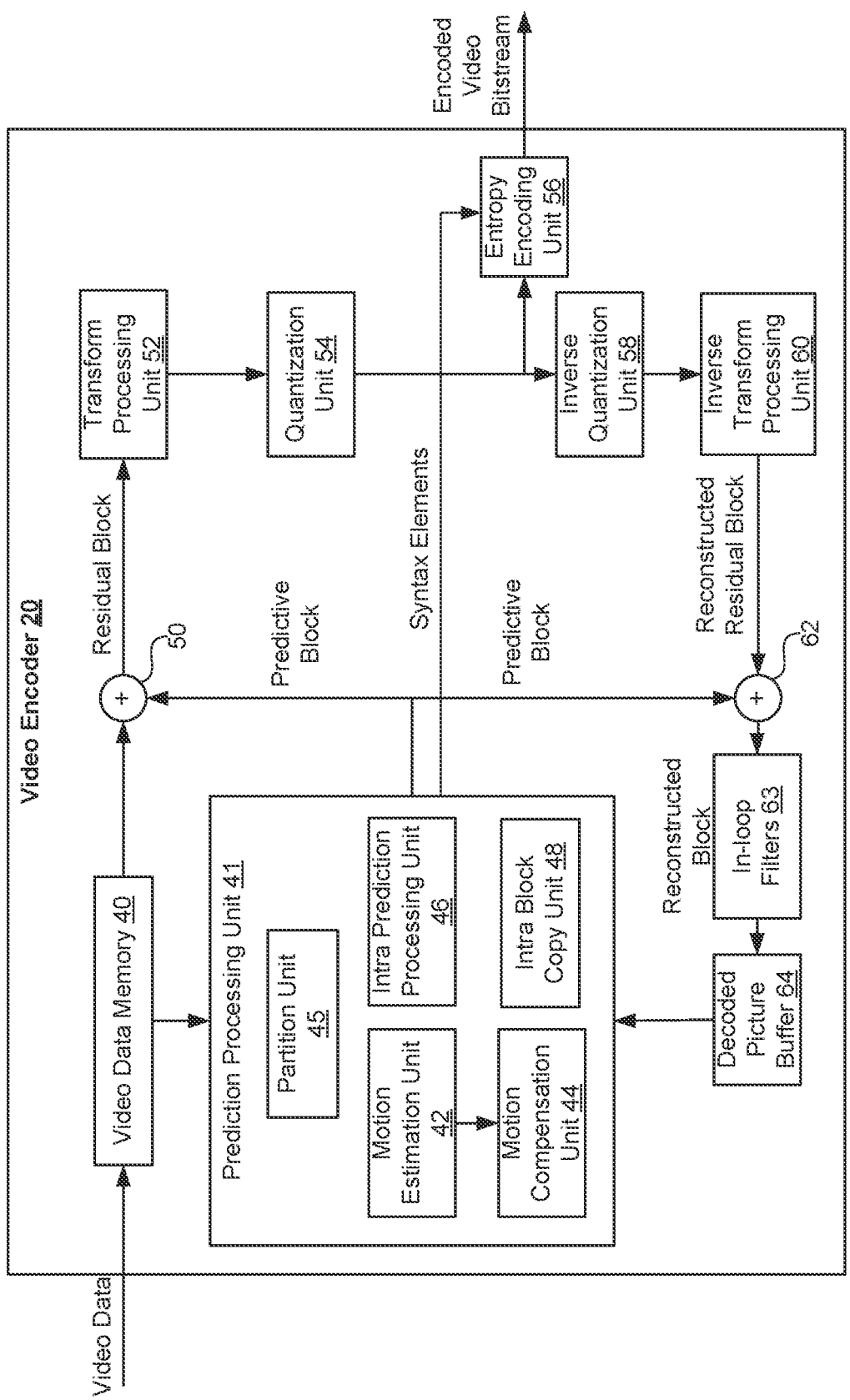
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values.

A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

Consistent with the present disclosure, various tools can be adapted to improve the coding efficiency of prediction processing unit 41. For example, to improve the coding efficiency of motion vector, coding tools, like history-based MVP (HMVP) and adaptive motion vector resolution (AMVR) may be used. To improve the accuracy of motion compensation, several coding tools may be incorporated e.g., affine motion compensation, geometry partitioning, bi-prediction with CU-level weight (BCW), etc.

In some implementations, in addition to the merge mode, a merge mode with motion vector differences (MMVD) can be used for motion compensation prediction. A MMVD flag is signaled right after sending a regular merge flag to specify whether MMVD mode is used for a CU. In MMVD, after a merge candidate is selected, it is further refined by the signaled MVDs information. The further information includes a merge candidate flag, an index to specify motion magnitude, and an index for indication of motion direction. In MMVD mode, one for the first two candidates in the merge list is selected to be used as MV basis. The MMVD candidate flag is signaled to specify which one is used between the first and second merge candidates.

In some implementations, an affine motion compensated prediction mode may be used. In HEVC, only a translation motion model is applied for motion compensated prediction. While in the real world, there can be various kinds of motion, e.g., zoom in, zoom out, rotation, perspective motions, and other irregular motions, in the VVC and AVS3 standards, affine motion compensated prediction can be applied by signaling a flag for each inter coding block to indicate whether a translation motion model or an affine motion model is applied for inter prediction. A brief discussion with respect to affine mode is provided later in this disclosure with reference to FIGS. 5A-5B.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
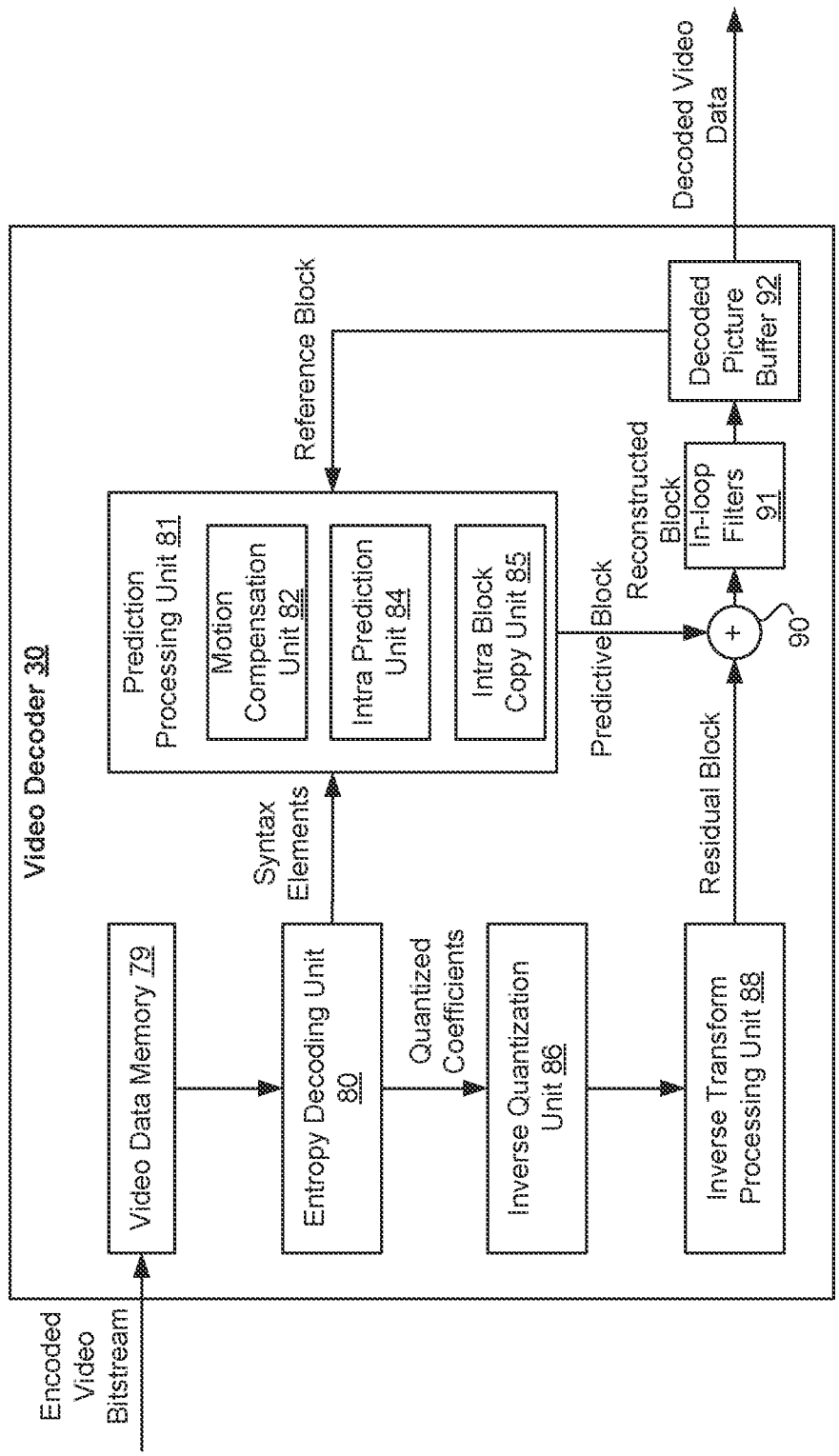
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
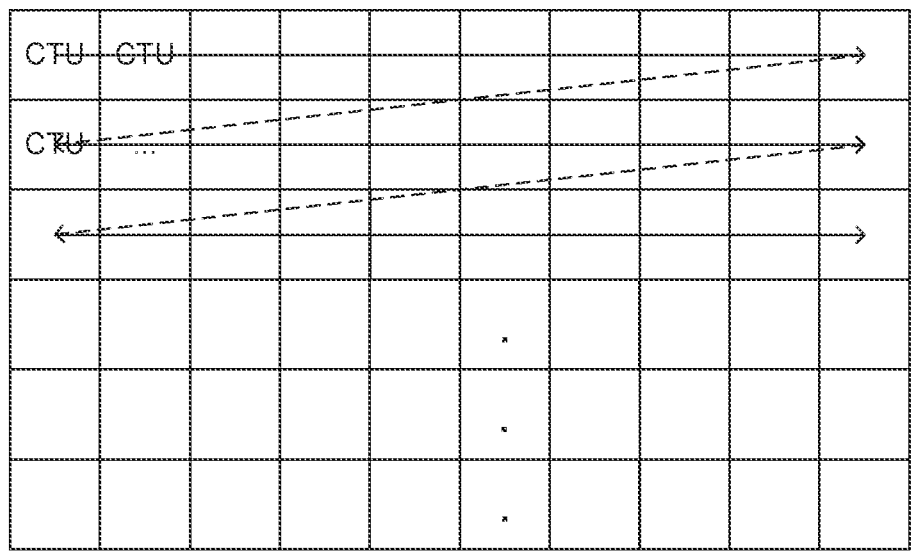
FIGS. 4A through 4E are graphical representations illustrating how a frame is recursively partitioned into multiple video blocks of different sizes and shapes in accordance with some implementations of the present disclosure.
Figure 4B:
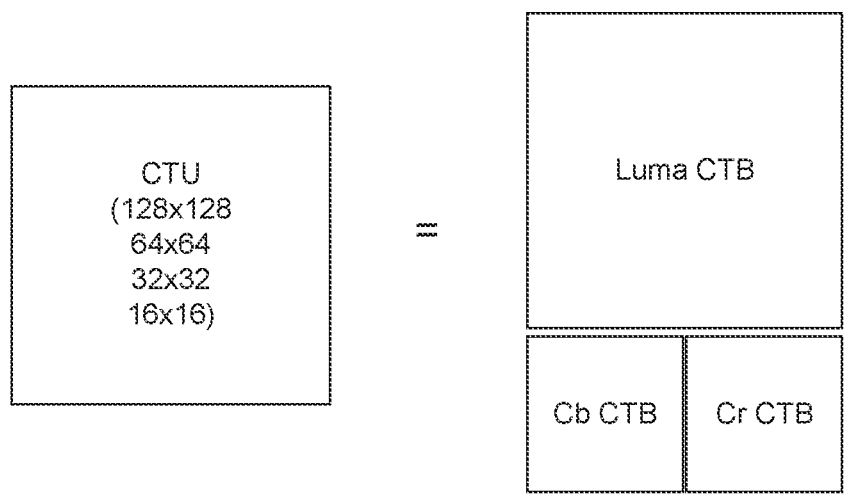

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
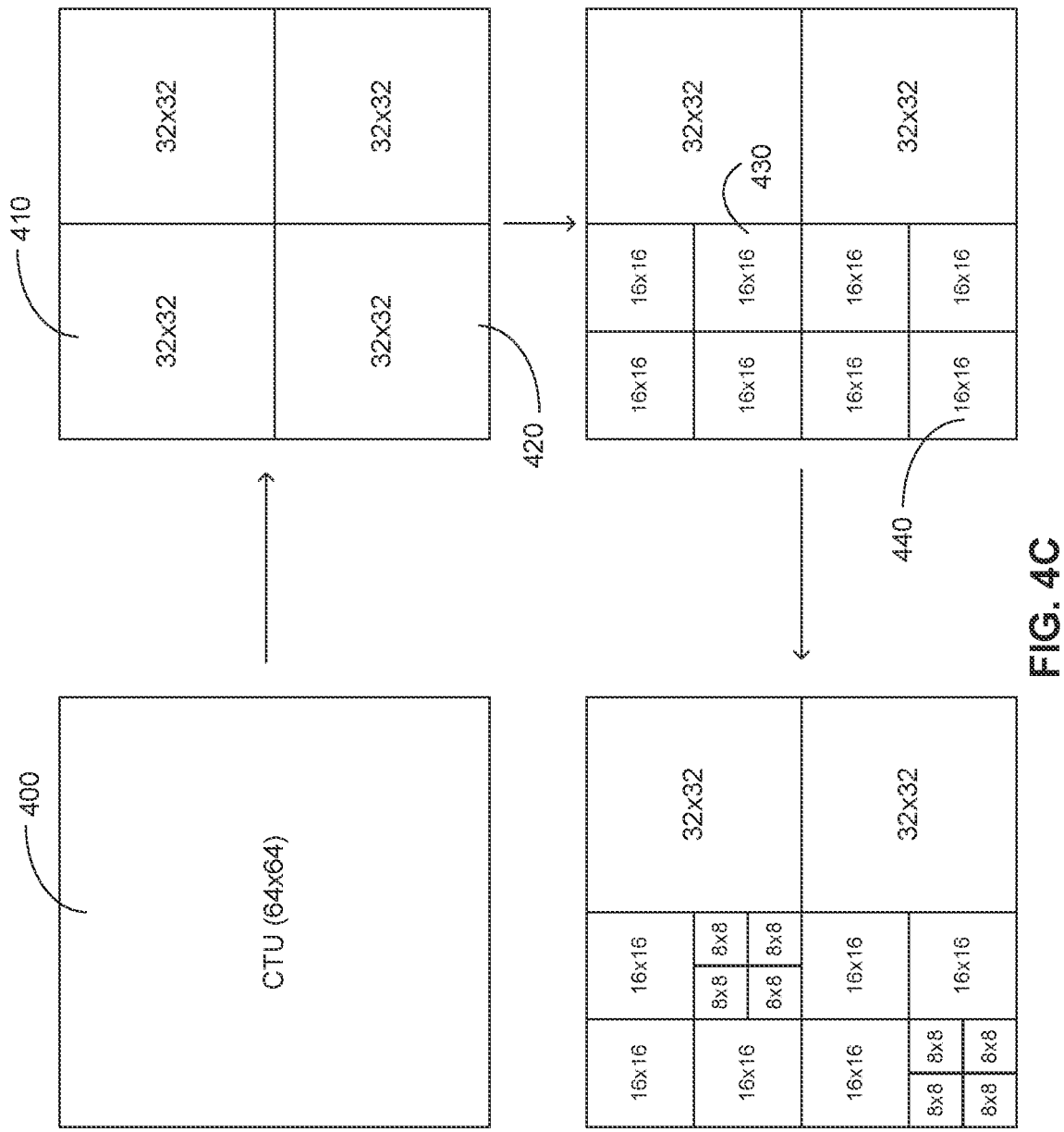
Figure 4D:
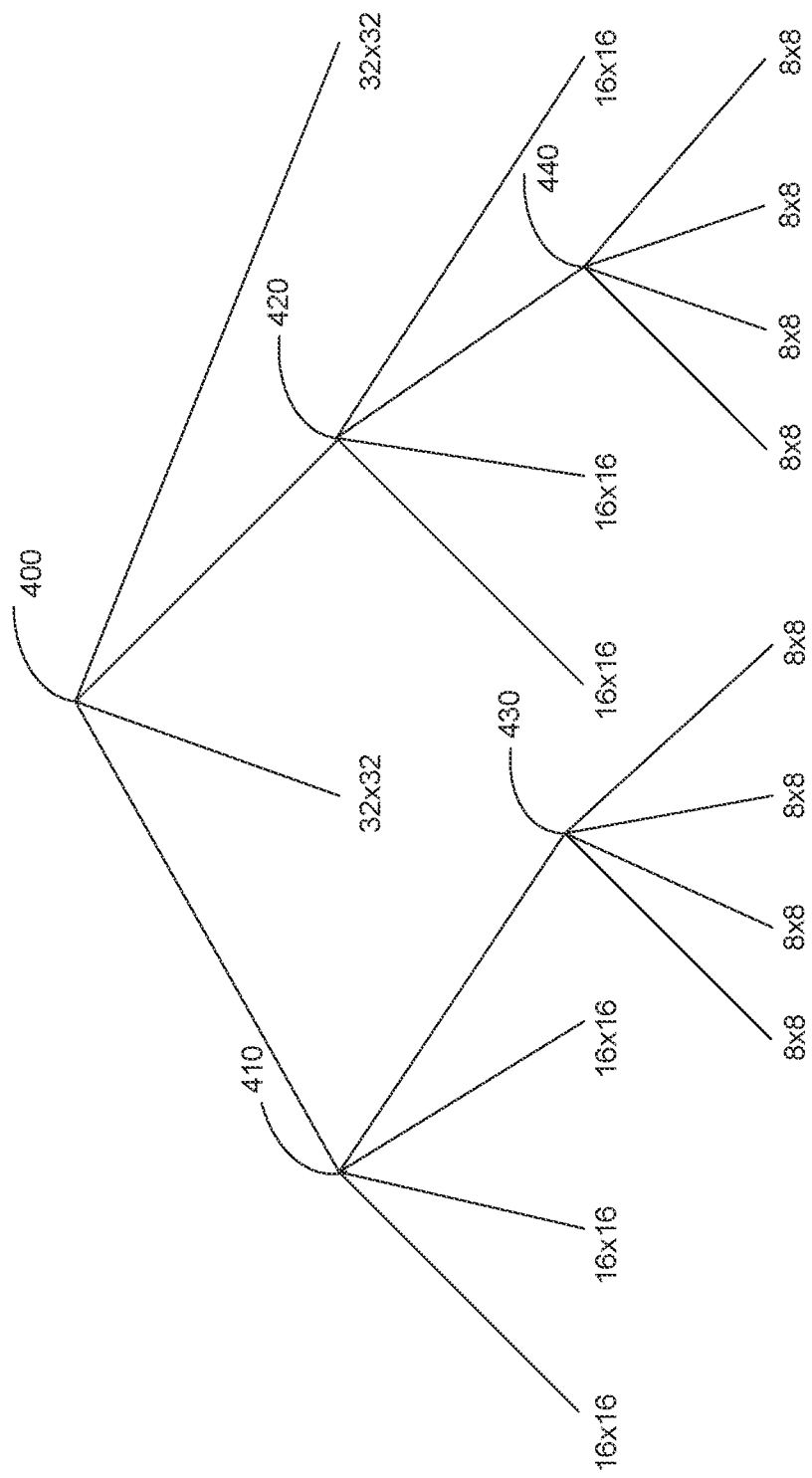
Figure 4E:
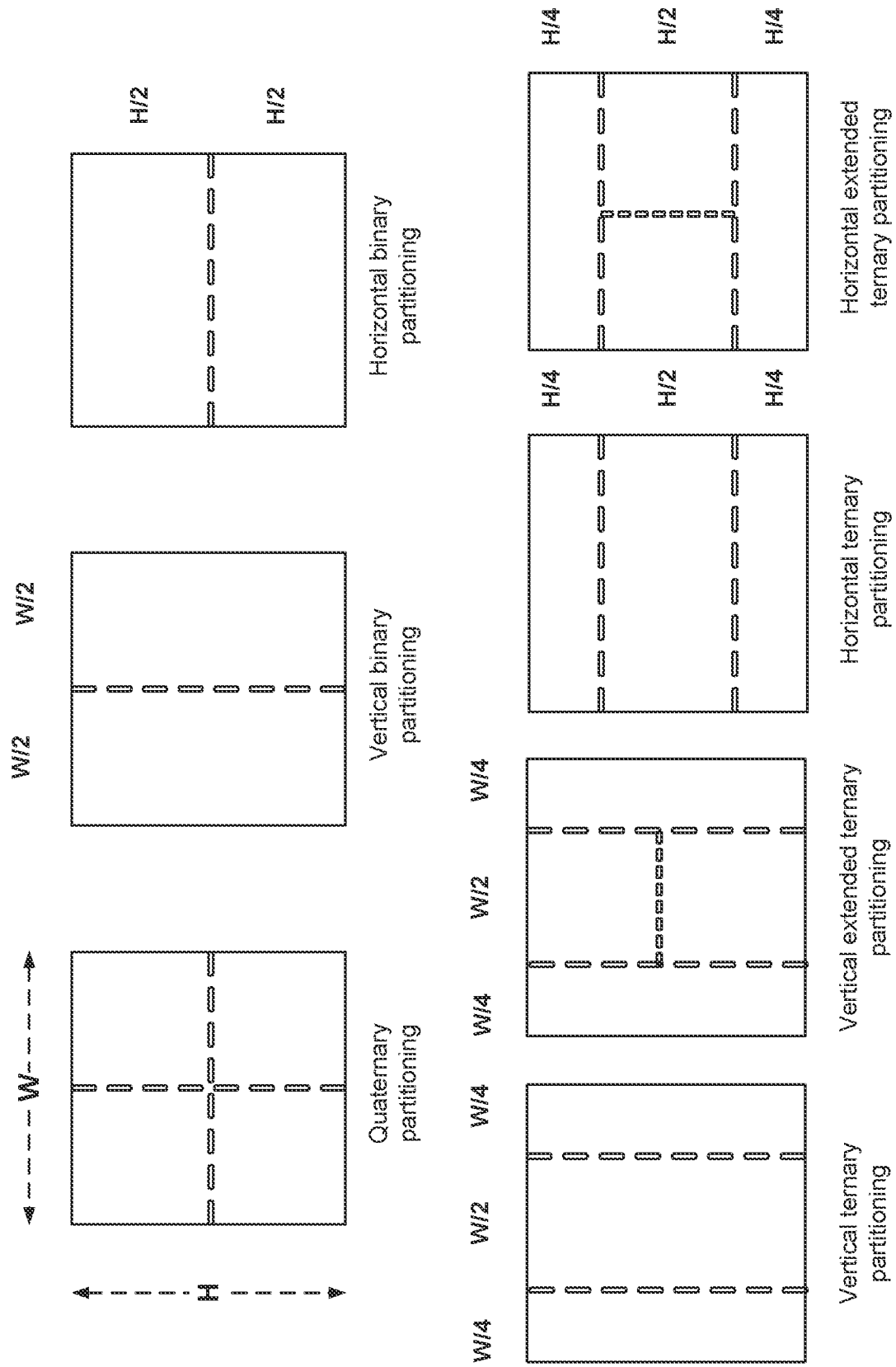

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

Figure 5A:
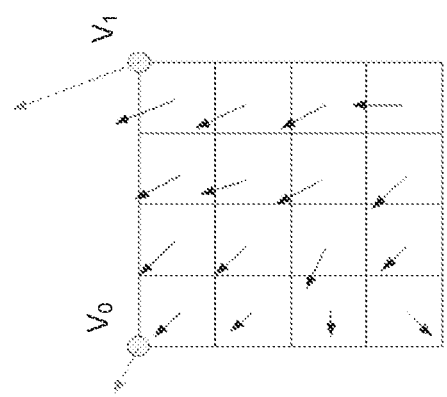
FIG. 5A illustrates an exemplary 4-parameter affine motion model in accordance with some implementations of the present disclosure.
Figure 5A:
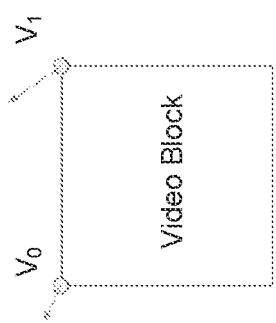
Figure 5B:
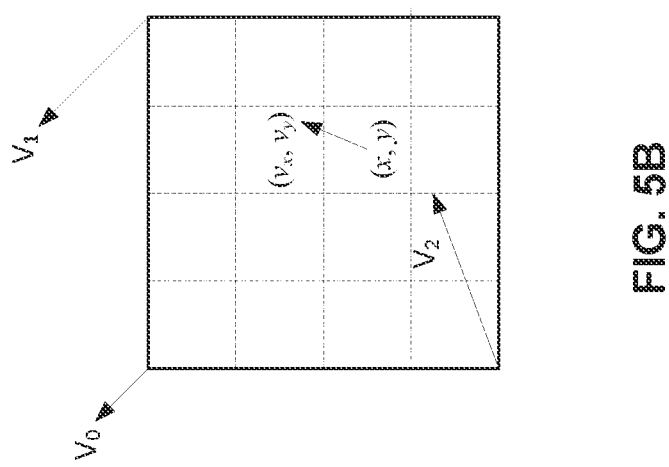
FIG. 5B illustrates an exemplary 6-parameter affine motion model in accordance with some implementations of the present disclosure.

FIGS. 5A-5B illustrate an exemplary 4-parameter affine motion model and an exemplary 4-parameter affine motion model, respectively, in accordance with some implementations of the present disclosure. In some implementations, one of these two affine modes can be selected and applied to code a video block, e.g., by prediction processing unit 41 of FIG. 2.

The 4-parameter affine motion model shown in FIG. 5A includes the following affine parameters: two parameters for translation movement in horizontal and vertical directions respectively, one parameter for zoom motion, and one parameter for rotational motion for both horizontal and vertical directions. In this model, the horizontal zoom parameter can be equal to the vertical zoom parameter, and the horizontal rotation parameter can be equal to the vertical rotation parameter. To achieve a better accommodation of the motion vectors and affine parameters, the affine parameters of this model can be coded with two motion vectors (referred to as control point motion vectors (CPMVs)) located at two control points (e.g., the top-left corner and top-right corner) of a current video block. As shown in FIG. 5A, an affine motion field of the video block (e.g., motion vectors of the video block) can be described by two CPMVs $V_0$ and $V_1$. Based on the control point motion, a motion field of an affine coded sub-block with a position (x, y) within the video block can be derived using the following expression (1):

$$v_x = \frac{(v_{1x} - v_{0x})}{w}x - \frac{(v_{1y} - v_{0y})}{w}y + v_{0x}$$
$$v_y = \frac{(v_{1y} - v_{0y})}{w}x + \frac{(v_x - v_{0x})}{w}y + v_{0y}$$
(1)

In the above expression (1), $v_x$ and $v_y$ denote an x-component and a y-component of a motion vector of the affine coded sub-block at the position (x, y), respectively. w denotes a width of the video block. $v_{0x}$ and $v_{0y}$ denote an x-component and a y-component of the CPMV $V_0$, respectively. $v_{1x}$ and $v_{1y}$ denote an x-component and a y-component of the CPMV $V_1$, respectively.

The 6-parameter affine motion model as shown in FIG. 5B includes the following affine parameters: two parameters for translation movement in the horizontal and vertical directions respectively, two parameters for zoom motion and rotation motion respectively in the horizontal direction, and another two parameters for zoom motion and rotation motion respectively in the vertical direction. The 6-parameter affine motion model can be coded with three CPMVs at three control points. As shown in FIG. 5B, the three control points of the 6-parameter affine video block are located at the top-left, top-right, and bottom left corners of the video block, and associated with CPMVs $V_0$, $V_1$, and $V_2$, respectively. The motion at the top-left control point is related to the translation motion, the motion at the top-right control point is related to rotation and zoom motion in the horizontal direction, and the motion at the bottom-left control point is related to rotation and zoom motion in the vertical direction. Compared to the 4-parameter affine motion model, the rotation and zoom motion in the horizontal direction of the 6-parameter affine motion model may not be the same as the rotation and zoom motion in the vertical direction. A motion vector ($v_x$, $v_y$) of each sub-block located at a position (x, y) of the video block can be derived using the three CPMVs at the three control points by:

$$v_x = v_{0x} + (v_{1x} - v_{0x}) * \frac{x}{w} + (v_{2x} - v_{0x}) * \frac{y}{h}$$
$$v_y = v_{0y} + (v_{1y} - v_{0y}) * \frac{x}{w} + (v_{2y} - v_{0y}) * \frac{y}{h}$$
(2)

In the above expression (2), $v_x$ and $v_y$ denote an x-component and ay-component of the motion vector of the affine coded sub-block at the position (x, y), respectively. w and h denote a width and a height of the video block, respectively. $v_{0x}$ and $v_{0y}$ denote an x-component and a y-component of the CPMV $V_0$, respectively. $v_{1x}$ and $v_{1y}$ denote an x-component and a y-component of the CPMV $V_1$, respectively. $v_{2x}$ and $v_{2y}$ denote an x-component and a y-component of the CPMV $V_2$, respectively.

In some implementations, in order to simplify the motion compensation prediction, block based affine transform prediction is applied. To derive motion vector of each 4×4 luma subblock, the motion vector of the center sample of each subblock is calculated and rounded to 1/16 fraction accuracy. Then the motion compensation interpolation filters are applied to generate the prediction of each subblock with derived motion vector. The subblock size of chroma components is also set to be 4×4. The MV of a 4×4 chroma subblock is calculated as the average of the MVs of the top-left and bottom-right luma subblocks in the collocated 8×8 luma region.

Like the translational motion inter prediction, several affine motion prediction modes may be used, such as an affine merge mode, affine AMVP mode or an affine MMVD. In addition, an affine MMVD may be used in ECM, which combines the affine merge mode and the MMVD mode.

In some implementation, the affine merge mode can be applied for CU with both width and height larger than or equal to 8. In affine merge mode, the CPMVs of the current CU are generated based on the motion information of the spatial neighboring CUs. There can be up to five CPMVP candidates and an index is signalled to indicate the one to be used for the current CU.

In some implementations, the affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream.

In some implementations, the affine MMVD mode can be applied. Affine MMVD mode is a combination of affine merge mode and MMVD mode. In addition to the affine merge index which indicates the motion information for the PU, MVD information is further signaled to refine the motion information. Then the distance index and direction index are signaled sequentially to indicate the MVD.

Consistent with the present disclosure, affine prediction mode may be used with geometry partition mode to improve coding efficiency of affine motion compensated prediction. In particular, affine motion compensated prediction is typically applied to rectangular blocks. However, in practice the moving objects may have irregular shape. Consistent with the disclosure, geometry partitioning is adopted to handle the moving objects with irregular shape.

Figure 6:
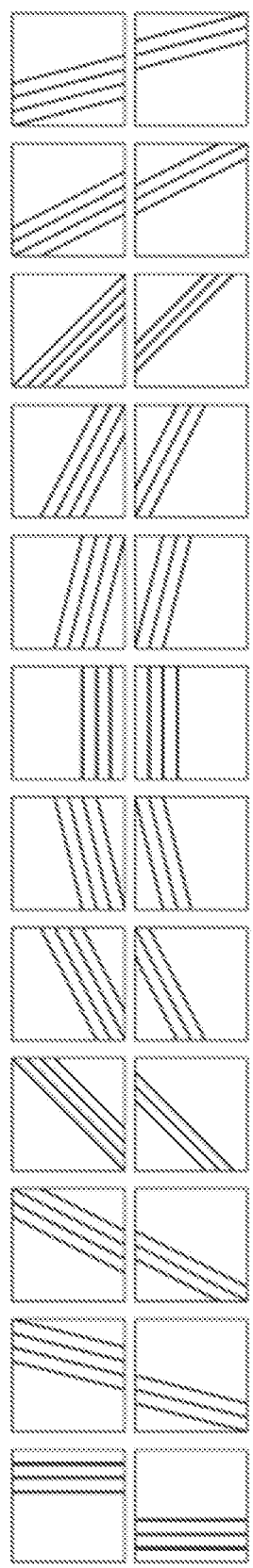
FIG. 6 is a graphical representation illustrating exemplary geometry partitions in accordance with some implementations of the present disclosure.

In the VVC, a Geometric Partitioning Mode (GPM) is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8. For example, FIG. 6 is a graphical representation illustrating exemplary geometry partitions in accordance with some implementations of the present disclosure. As shown by FIG. 6, when the GPM mode is used, a CU is split into two parts by a geometrically located straight line. In some implementation, the location of the splitting line may be mathematically derived from the angle and offset parameters of a specific partition.

Each partition of a geometric partition in the CU may be inter-predicted using its own motion. In some implementations, only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level.

Figure 7:
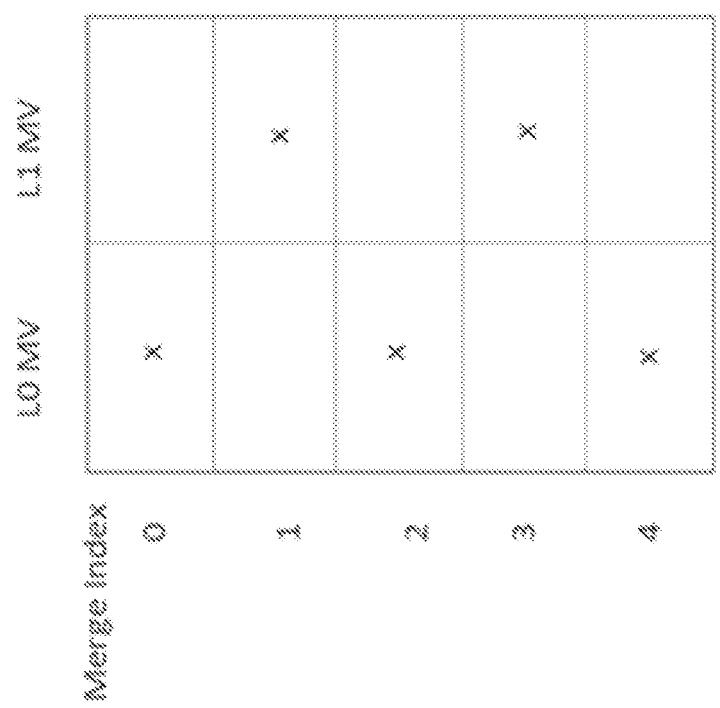
FIG. 7 illustrates an exemplary uni-prediction motion vector selection from motion vectors of merge candidate list for geometry partition mode in accordance with some implementations of the present disclosure.

In some implementations, to derive the uni-prediction motion vector for one geometric partition, one uni-prediction candidate list is firstly derived directly from the regular merge candidate list generation process. For example, FIG. 7 illustrates an exemplary uni-prediction motion vector selection from motion vectors of merge candidate list for geometry partition mode in accordance with some implementations of the present disclosure. As shown in FIG. 7, n denotes the index of the uni-prediction motion in the geometric uni-prediction candidate list. The LX motion vector of the n-th merge candidate, with X equal to the parity of n, is used as the n-th uni-prediction motion vector for geometric partitioning mode. These motion vectors are marked with "x" in FIG. 7. In case a corresponding LX motion vector of the n-the extended merge candidate does not exist, the L(1−X) motion vector of the same candidate is used instead as the uni-prediction motion vector for geometric partitioning mode.

In some implementations, the usage of the GPM can be indicated by signaling one flag at the CU-level on the encoder side, e.g., by video encoder 20. The flag is only signaled when the current CU is coded by either merge mode or skip mode. For example, when the flag is equal to one, it indicates the current CU is predicted by the GPM. Otherwise (the flag is equal to zero), the CU is coded by another merge mode such as regular merge mode, merge mode with motion vector differences, combined inter and intra prediction and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 5). After that, two syntax elements merge_gpm_idx0 and merge_gpm_idx1 are signaled to indicate the indices of the uni-prediction merge candidates that are used for the first and second GPM partitions. In some implementations, those two syntax elements are used to determine the uni-directional MVs of the two GPM partitions from the uni-prediction merge list as described in the section "uni-prediction merge list construction."

In some implementations, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. For example, if the second uni-prediction merge index is smaller than the first uni-prediction merge index, its original value is directly signaled. Otherwise (the second uni-prediction merge index is larger than the first uni-prediction merge index), its value is subtracted by one before being signaled to bit-stream.

At the decoder side, e.g., video decoder 30, the first uni-prediction merge index is firstly decoded. In some implementations, to decode the second uni-prediction merge index, if the parsed value is smaller than the first uni-prediction merge index, the second uni-prediction merge index is set equal to the parse value. Otherwise (the parsed value is equal to or larger than the first uni-prediction merge index), the second uni-prediction merge index is set equal to the parsed value plus one. As an example, Table 1 illustrates the existing syntax elements that are used for the GPM mode in the current VVC specification.

TABLE 1

|  | Descriptor |
|---|---|
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |
|     merge_gpm_idx0[ x0 ][ y0 ] | ae(v) |
|     if( MaxNumGpmMergeCand > 2 ) | |
|       merge_gpm_idx1[ x0 ][ y0 ] | ae(v) |
|   } | |
| ...... | |
| } | |

In some implementations, truncated unary code may be used for the binarization of the two uni-prediction merge indices, merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand−1 and MaxGPMMergeCand−2 for merge_gpm_idx0 and merge_gpm_idx1, respectively. MaxGPMMergeCand is the number of the candidates in the uni-prediction merge list.

Consistent with the present disclosure, affine motion compensated prediction is implemented with geometry partitioning. In these implementations, a CU may be partitioned into two parts and each part may be coded with a different mode or the two parts are coded with the same mode but with different parameters. At least one mode used for coding the two parts is an affine mode, such as one of those disclosed above. In combination with the affine mode, an inter mode or an intra mode may also be used to code one of the two parts. By using geometry partition mode along with affine mode, the disclosed motion compensation prediction method can handle moving objects with irregular shapes as well as high-order motions.

Figure 8:
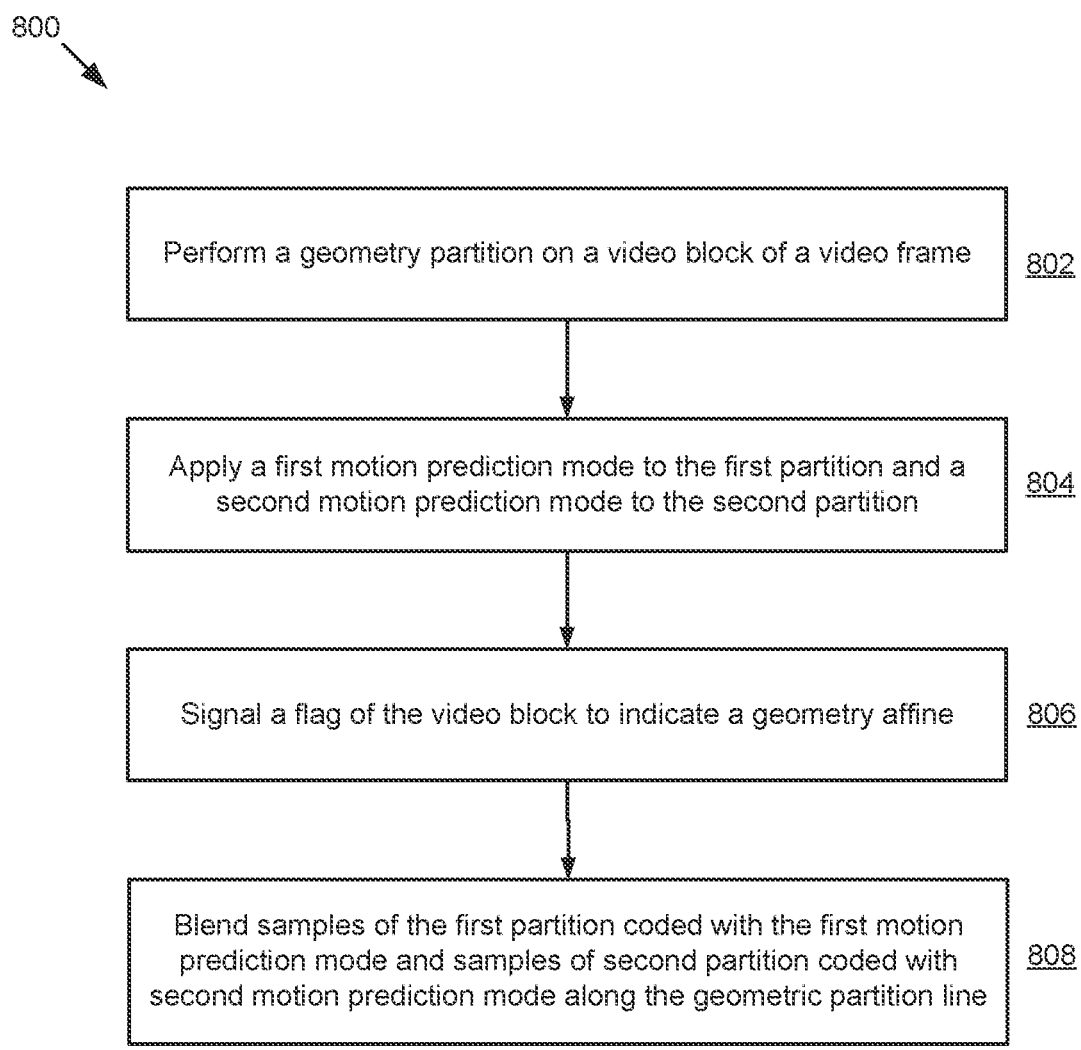
FIG. 8 is a flow chart of an exemplary method for motion compensation prediction with geometry partition in a video in accordance with some implementations of the present disclosure.
Figure 9:
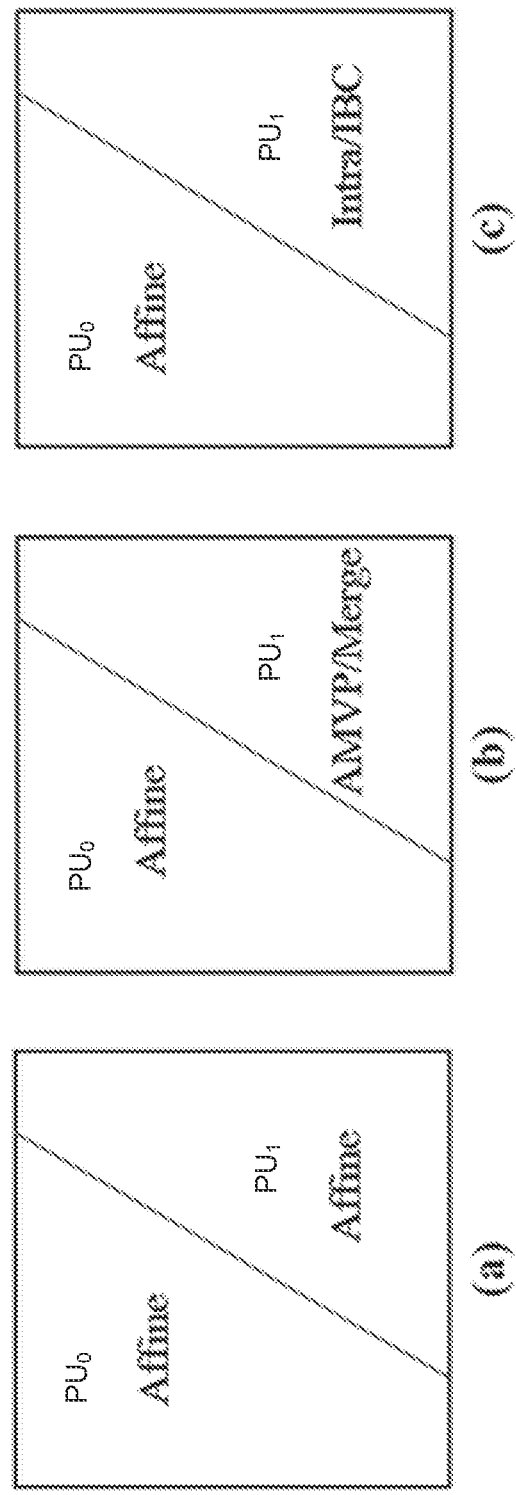
FIG. 9 is a graphical representation illustrating exemplary affine motion compensated prediction with geometry partitions in accordance with some implementations of the present disclosure.

FIG. 8 is a flow chart of an exemplary method 800 for motion compensation prediction with geometry partition in a video in accordance with some implementations of the present disclosure. Method 800 may be implemented by a video processor associated with video encoder 20 or video decoder 30, and may include steps 802-808 as described below. Some of the steps may be optional to perform the disclosure provided herein, depending on the different technical implementations. Further, some of the steps may be performed simultaneously, or in a different order than shown in FIG. 8. All such variations of the embodiments are within the scope of the present application. FIG. 9 is a graphical representation illustrating exemplary affine motion compensated prediction with geometry partitions in accordance with some implementations of the present disclosure. FIGS. 8-9 will be described together.

In step 802, the video processor may perform a geometry partition on a video block of a video frame from the video. In some implementations, the video block may be a CU. The CU can be partitioned into two parts by a geometrically located line, as shown in FIG. 9. For example, the two parts in the CU as separated by the geometrically located line may be denoted as partitions $PU_0$ and $PU_1$ respectively. As shown in FIG. 9, with geometry partitioning, $PU_0$ and $PU_1$ are not rectangular. The angle and offset of the geometrically located lines shown in FIG. 9 are only exemplary. Other angles and offsets may be used according to the specific application, e.g., based on the shape of the moving object in the video.

In step 804, the video processor may apply a first motion prediction mode to the first partition (e.g., $PU_0$ shown in FIG. 9 in each partition example) and a second motion prediction mode to the second partition (e.g., $PU_1$ shown in FIG. 9 in each partition example). Consistent with the present disclosure, at least one mode applied is an affine mode.

In step 806, the video processor may signal a flag of the video block to indicate a geometry affine mode. In some implementations, a flag of the video block indicating a geometry affine mode is applied to the video block may be signaled. Alternatively, a flag of the video block indicating a geometry affine mode is enabled for the video block may be signaled. In some implementations, if the same mode (for example, an affine mode) is applied to code both partitions, then a flag at the CU level is signaled to indicate the geometry affine mode. Otherwise, if different modes are applied to the two partitions respectively, then a flag at CU level is signaled to indicate the geometry affine mode followed by an index to indicate which combination is utilized. In some implementations, information indicating the selected prediction modes is encoded in a bitstream, e.g., including the flag signaled at the CU level, the index indicating the combination of motion prediction modes used for the partitions in the CU, and other flags and indices signaled to indicate the motion information of the partitions or parameters defining the motion prediction modes.

Various implementations of steps 804 and 806 are described with reference to FIG. 9. FIG. 9 shows three different combinations of motion compensation prediction modes applied to the two partitions $PU_0$ and $PU_1$.

In the first example shown in FIG. 9(*a*), both partitions are coded using affine mode, including affine AMVP mode, affine merge mode or affine merge with motion vector difference (MMVD) mode. Accordingly, there are a total of six different combinations according to the affine mode type of each partition. It should be noted that each of the following cases can be utilized separately or jointly.

In the first example combination of FIG. 9(*a*), both PUs in the CU are coded with affine AMVP mode. For each PU, a flag is signaled to indicate 4-parameter or 6-parameter affine mode as described with reference to FIGS. 5A-5B. Then inter prediction direction, reference index and the difference of CPMV and CPMV predictor are signaled in the bitstream. Finally, CMVP index is signaled to indicate the CMVP.

In the second example combination of FIG. 9(*a*), one PU in the CU is coded with affine AMVP mode and another PU is coded with affine merge mode. According to the prediction mode of each PU, this combination has the following two possible implementations:

$PU_0$ is coded with affine AMVP mode and $PU_1$ is coded with affine merge mode $PU_0$ is coded with affine merge mode and $PU_1$ is coded with affine AMVP mode If this combination is selected for the current CU, then the pred_mode_combination_idx is signaled to indicate which combination is utilized. For the PU coded with affine AMVP, a flag is signaled to indicate 4-parameter or 6-parameter affine mode, followed by the inter prediction direction, reference index, CPMV difference and CMVP index. For the PU coded with affine merge mode, the affine merge index is signaled.

In the third example combination of FIG. 9(*a*), one PU in the CU is coded with affine AMVP mode and another PU is coded with affine MMVD mode. According to the prediction mode of each PU, this combination has the following two possible implementations:

$PU_0$ is coded with affine AMVP mode and $PU_1$ is coded with affine MMVD mode $PU_0$ is coded with affine MMVD mode and $PU_1$ is coded with affine AMVP mode If this combination is selected for the current CU, then the pred_mode_combination_idx is signaled to indicate which combination is utilized. For the PU coded with affine AMVP, a flag is signaled to indicate 4-parameter or 6-parameter affine mode, followed by the inter prediction direction, reference index, CPMV difference and CMVP index. For the PU coded with affine MMVD mode, the affine MMVD candidate flag is signaled, followed by the distance index and direction index.

In the fourth example combination of FIG. 9(*a*), both PUs in a CU are coded with affine merge mode but with different affine merge index. If this case is selected for the current CU, then two affine merge indices are signaled to indicate the motion information of the two PUs separately.

In the fifth example combination of FIG. 9(*a*), one PU in the CU is coded with affine merge mode and another PU is coded with affine MMVD mode. According to the prediction mode of each PU, this case has the following combinations.

$PU_0$ is coded with affine merge mode and $PU_1$ is coded with affine MMVD mode $PU_0$ is coded with affine MMVD mode and $PU_1$ is coded with affine merge mode If this case is selected for the current CU, then the pred_mode_combination_idx is signaled to indicate which combination is utilized. For the PU coded with affine merge mode, the affine merge index is signaled to indicate the motion information of the PU. For the PU coded with affine MMVD mode, the affine MMVD candidate flag is signaled followed by the distance index and direction index.

In the sixth example combination of FIG. 9(*a*), both PUs in a CU are coded with affine MMVD mode but with different affine merge indices. If this case is selected for the current CU, then two affine MMVD candidate flags are signaled to indicate the motion information of the two PUs separately, followed by the distance indices and direction indices for the two PUs separately.

In some implementations, the construction of affine AMVP candidates can reuse that of the current affine AMVP mode. The CPMVP candidate list construction of regular affine merge mode can be reused for the geometry affine merge mode. As an example, Table 2 provides the syntax elements of combining two affine mode coded blocks.

TABLE 2

```
                                                                    Descriptor
merge_data( x0, y0, cbWidth, cbHeight, chType ) {
  if( CuPredMode[ chType ][ x0 ][ y0 ] = = MODE_IBC ) {
    if( MaxNumIbcMergeCand > 1 )
      merge_idx[ x0 ][ y0 ]                                         ae(v)
  } else {
    if( MaxNumSubblockMergeCand > 0 && cbWidth >= 8 &&
cbHeight >= 8 )
      merge_subblock_flag[ x0 ][ y0 ]                               ae(v)
    if( merge_subblock_flag[ x0 ][ y0 ] = = 1 ) {
      if( MaxNumSubblockMergeCand > 1 )
        merge_subblock_idx[ x0 ][ y0 ]                              ae(v)
    } else {
      if( cbWidth < 128 && cbHeight < 128 && ( ( sps_ciip_enabled_flag
&& cu_skip_flag[ x0 ][ y0] = = 0 && ( cbWidth * cbHeight ) >= 64 ) | |
( sps_gpm_enabled_flag && sh_slice_type = = B && cbWidth >= 8 &&
cbHeight >= 8 && cbWidth < ( 8 * cbHeight ) && cbHeight <
( 8 * cbWidth ) ) ) )
        regular_merge_flag[ x0 ][ y0 ]                              ae(v)
      if( regular_merge_flag[ x0 ][ y0 ] = = 1 ) {
        if( sps_mmvd_enabled_flag )
          mmvd_merge_flag[ x0 ][ y0 ]                               ae(v)
        if( mmvd_merge_flag[ x0 ][ y0 ] = = 1 ) {
          if( MaxNumMergeCand > 1 )
            mmvd_cand_flag[ x0 ][ y0 ]                              ae(v)
          mmvd_distance_idx[ x0 ][ y0 ]                             ae(v)
          mmvd_direction_idx[ x0 ][ y0 ]                            ae(v)
        } else if( MaxNumMergeCand > 1 )
          merge_idx[ x0 ][ y0 ]                                     ae(v)
      } else {
        if( sps_ciip_enabled_flag && sps_gpm_enabled_flag &&
sh_slice_type = = B && cu_skip_flag[ x0 ][ y0 ] = = 0 && cbWidth >=
8 && cbHeight >= 8 && cbWidth < ( 8 * cbHeight ) && cbHeight <
( 8 * cbWidth ) && cbWidth < 128 && cbHeight < 128 )
          ciip_flag[ x0 ][ y0 ]                                     ae(v)
        if( ciip_flag[ x0 ][ y0 ] && MaxNumMergeCand > 1 )
          merge_idx[ x0 ][ y0 ]                                     ae(v)
          gpm_affine_flag[x0][y0]                                   ae(v)
          if( !ciip_flag[ x0 ][ y0 ] ) {
        if(!ciip_flag[ x0 ][ y0 ] && !gpm_affine_flag[x0][y0]){
          merge_gpm_partition_idx[ x0 ][ y0 ]                       ae(v)
          merge_gpm_idx0[ x0 ][ y0 ]                                ae(v)
          if( MaxNumGpmMergeCand > 2 )
            merge_gpm_idx1[ x0 ][ y0 ]                              ae(v)
        }
        else{
            merge_gpm_affine_idx0[ x0 ][ y0 ]                       ae(v)
          merge_gpm_affine_idx1[ x0 ][ y0 ]                         ae(v)
        }
      }
    }
  }
}
```

In some scenarios, part of the CU may follow the affine motion while other part may follow the simple translation motion. To handle this situation effectively, as shown by the second example of FIG. 9(b), one partition is coded using affine mode and the other partition is coded with regular translational inter mode. Again, the affine mode can be selected from the affine AMVP mode, affine merge mode or affine MMVD mode. The translational inter mode may be selected from the regular AMVP mode, regular merge mode, and regular MMVD mode. Accordingly, there are a total of twelve different combinations in the example of FIG. 9(b).

In the first example combination of FIG. 9(b), one PU in the CU is coded with affine AMVP and another PU is coded with inter AMVP. According to the prediction mode of each PU, there are two possible implementations of this combination:

PU$_0$ is coded with affine AMVP mode and PU$_1$ is coded with regular AMVP mode PU$_0$ is coded with regular AMVP mode and PU$_1$ is coded with affine AMVP mode For the first combination, affine AMVP is applied for PU$_0$ and inter AMVP is applied for PU$_1$, and for the second combination, inter AMVP is applied for PU$_0$ and affine AMVP is applied for PU$_1$. If this case is selected for the current CU, then the pred_mode_combination_idx is signaled to indicate which combination is utilized. For the PU coded with affine AMVP mode, a flag is signaled to indicate 4-parameter or 6-parameter affine mode, followed by the inter prediction direction, reference index, CPMV difference and CMVP index. For the PU coded with inter AMVP mode, the inter prediction direction, reference index, AMVP index and MVD are signaled.

In the second example combination of FIG. 9(b), one PU in the CU is coded with affine AMVP and another PU is coded with regular merge mode. According to the prediction mode of each PU, there are two possible implementations for this combination:

PU$_0$ is coded with affine AMVP mode and PU$_1$ is coded with regular merge mode $PU_0$ is coded with regular merge mode and $PU_1$ is coded with affine AMVP mode For the first combination, affine AMVP mode is applied for $PU_0$ and regular merge mode is applied for $PU_1$, and for the second combination, regular merge mode is applied for $PU_0$ and affine AMVP mode is applied for $PU_1$. If this case is selected for the current CU, then the pred_mode_combination_idx is signaled to indicate which combination is utilized. For the PU coded with affine AMVP mode, a flag is signaled to indicate 4-parameter or 6-parameter affine mode, followed by the inter prediction direction, reference index, CPMV difference and CMVP index. For the PU coded with regular merge mode, the merge index is signaled.

In the third example combination of FIG. 9(b), one PU in the CU is coded with affine merge mode and another PU is coded with regular AMVP mode. According to the prediction mode of each PU, there are two possible implementations for this combination:

$PU_0$ is coded with affine merge mode and $PU_1$ is coded with regular AMVP mode $PU_0$ is coded with regular AMVP mode and $PU_1$ is coded with affine merge mode For the first combination, affine merge is applied for $PU_0$ and inter AMVP is applied for $PU_1$, and for the second combination, inter AMVP is applied for $PU_0$ and affine merge is applied for $PU_1$. If this case is selected for the current CU, then the pred_mode_combination_idx is signaled to indicate which combination is utilized. For the PU coded with affine merge mode, the affine merge index is signaled. For the PU coded with regular AMVP mode, the prediction direction, reference index, AMVP index and MVD are signaled.

In the fourth example combination of FIG. 9(b), one PU in the CU is coded with affine merge mode and another PU is coded with regular merge mode. According to the prediction mode of each PU, there are two possible implementations for this combination as follows:

$PU_0$ is coded with affine merge mode and $PU_1$ is coded with regular merge mode $PU_0$ is coded with regular merge mode and $PU_1$ is coded with affine merge mode For the first combination, affine merge mode is applied for $PU_0$ and regular merge mode is applied for $PU_1$, and for the second combination, regular merge mode is applied for $PU_0$ and affine merge mode is applied for $PU_1$. If this case is selected for the current CU, then the pred_mode_combination_idx is signaled to indicate which combination is utilized. For the PU coded with affine merge mode, the affine merge index is signaled. For the PU coded with regular merge mode, the merge index is signaled.

In the fifth example combination of FIG. 9(b), one PU in the CU is coded with affine AMVP mode and another PU is coded with regular MMVD mode. According to the prediction mode of each PU, there are two possible implementations for this combination as follows:

$PU_0$ is coded with affine AMVP mode and $PU_1$ is coded with MMVD mode $PU_0$ is coded with MMVD mode and $PU_1$ is coded with affine AMVP mode For the first combination, affine AMVP mode is applied for $PU_0$ and MMVD mode is applied for $PU_1$, and for the second combination, MMVD mode is applied for $PU_0$ and affine AMVP mode is applied for $PU_1$. If this case is selected for the current CU, then the pred_mode_combination_idx is signaled to indicate which combination is utilized. For the PU coded with affine AMVP mode, a flag is signaled to indicate 4-parameter or 6-parameter affine mode, followed by the inter prediction direction, reference index, CPMV difference and CMVP index. For the PU coded with MMVD mode, the merge index is signaled followed by the distance index and direction index.

In the sixth example combination of FIG. 9(b), one PU in the CU is coded with affine merge mode and another PU is coded with MMVD mode. According to the prediction mode of each PU, there are two possible implementations for this combination as follows:

$PU_0$ is coded with affine merge mode and $PU_1$ is coded with MMVD mode $PU_0$ is coded with MMVD mode and $PU_1$ is coded with affine merge mode For the first combination, affine merge mode is applied for $PU_0$ and MMVD mode is applied for PU, and for the second combination, MMVD mode is applied for $PU_0$ and affine merge mode is applied for $PU_1$. If this case is selected for the current CU, then the pred_mode_combination_idx is signaled to indicate which combination is utilized. For the PU coded with affine merge mode, the affine merge index is signaled. For the PU coded with MMVD mode, the MMVD candidate flag is signaled followed by the distance index and direction index.

In the seventh example combination of FIG. 9(b), one PU in the CU is coded with affine MMVD mode and another PU is coded with AMVP mode. According to the prediction mode of each PU, there are two possible implementations for this combination as follows:

$PU_0$ is coded with affine MMVD mode and $PU_1$ is coded with AMVP mode $PU_0$ is coded with AMVP mode and $PU_1$ is coded with affine MMVD mode For the first combination, affine MMVD mode is applied for $PU_0$ and AMVP mode is applied for $PU_1$, and for the second combination, AMVP mode is applied for $PU_0$ and affine MMVD mode is applied for $PU_1$. If this case is selected for the current CU, then the pred_mode_combination_idx is signaled to indicate which combination is utilized. For the PU coded with AMVP mode, the prediction direction, reference index, AMVP index and MVD are signaled. For the PU coded with affine MMVD mode, the affine MMVD candidate flag is signaled, followed by the distance index and direction index.

In the eighth example combination of FIG. 9(b), one PU in the CU is coded with affine MMVD mode and another PU is coded with regular merge mode. According to the prediction mode of each PU, there are two possible implementations for this combination as follows:

$PU_0$ is coded with affine MMVD mode and $PU_1$ is coded with regular merge mode $PU_0$ is coded with regular merge mode and $PU_1$ is coded with affine MMVD mode For the first combination, affine MMVD mode is applied for $PU_0$ and inter merge is applied for $PU_1$, and for the second combination, regular merge mode is applied for $PU_0$ and affine MMVD is applied for $PU_1$. If this case is selected for the current CU, then the pred_mode_combination_idx is signaled to indicate which combination is utilized. For the PU coded with affine MMVD mode, the affine MMVD candidate flag is signaled, followed by the distance index and direction index. For the PU coded with regular merge mode, the merge index is signaled.

In the ninth example combination of FIG. 9(b), one PU in the CU is coded with affine MMVD mode and another PU is coded with regular MMVD mode. According to the prediction mode of each PU, there are two possible implementations for this combination as follows:

PU₀ is coded with affine MMVD mode and PU₁ is coded with regular MMVD mode

PU₀ is coded with regular MMVD mode and PU₁ is coded with affine MMVD mode

For the first combination, affine MMVD mode is applied for PU₀ and regular MMVD mode is applied for PU₁, and for the second combination, regular MMVD mode is applied for PU₀ and affine MMVD mode is applied for PU₁. If this case is selected for the current CU, then the pred_mode_combination_idx is signaled to indicate which combination is utilized. For the PU coded with affine MMVD mode, the affine MMVD candidate flag is signaled followed by the distance index and direction index. For the PU coded regular inter MMVD mode, the MMVD candidate flag is signaled, followed by the distance index and direction index.

In the tenth example combination of FIG. 9(b), one PU in the CU is coded with affine AMVP mode and another PU is coded with inter template matching/bilateral matching (TM/BM) merge mode. According to the prediction mode of each PU, there are two possible implementations for this combination as follows:

PU₀ is coded with affine AMVP mode and PU₁ is coded with inter TM/BM merge mode

PU₀ is coded with inter TM/BM merge mode and PU₁ is coded with affine AMVP mode

For the first combination, affine AMVP mode is applied for PU₀ and inter TM/BM merge mode is applied for PU₁, and for the second combination, inter TM/BM merge mode is applied for PU₀ and affine AMVP mode is applied for PU₁. If this case is selected for the current CU, then the pred_mode_combination_idx is signaled to indicate which combination is utilized. For the PU coded with affine AMVP mode, a flag is signaled to indicate 4-parameter or 6-parameter affine mode, followed by the inter prediction direction, reference index, CPMV difference and CMVP index. For the PU coded with inter TM/BM merge mode, the merge index is signaled.

In the eleventh example combination of FIG. 9(b), one PU in the CU is coded with affine merge mode and another PU is coded with inter TM/BM merge mode. According to the prediction mode of each PU, there are two possible implementations for this combination as follows:

PU₀ is coded with affine merge mode and PU₁ is coded with inter TM/BM merge mode PU₀ is coded with inter TM/BM merge mode and PU₁ is coded with affine merge mode For the first combination, affine merge mode is applied for PU0 and inter TM/BM merge mode is applied for PU1, and for the second combination, inter TM/BM merge mode is applied for PU0 and affine merge mode is applied for PU1. If this case is selected for the current CU, then the pred_mode_combination_idx is signaled to indicate which combination is utilized. For the PU coded with affine merge mode, the affine merge index is signaled. For the PU coded with inter TM/BM merge mode, the merge index is signaled.

In the twelfth example combination of FIG. 9(b), one PU in the CU is coded with affine MMVD mode and another PU is coded with inter TM/BM merge mode. According to the prediction mode of each PU, there are two possible implementations of this combination as follows:

PU₀ is coded with affine MMVD mode and PU1 is coded with inter TM/BM merge mode

PU₀ is coded with inter TM/BM merge mode and PU₁ is coded with affine MMVD mode

For the first combination, affine MMVD mode is applied for PU0 and inter TM/BM merge mode is applied for PU1, and for the second combination, inter TM/BM merge mode is applied for PU0 and affine MMVD mode is applied for PU1. If this case is selected for the current CU, then the pred_mode_combination_idx is signaled to indicate which combination is utilized. For the PU coded with affine MMVD mode, the affine MMVD candidate flag is signaled followed by the distance index and direction index. For the PU coded with inter TM/BM merge mode, the merge index is signaled.

In some additional implementations, as further example combinations of FIG. 9(b), affine merge mode with TM/BM can also be combined with other inter mode in the similar manner as the case described above. It is contemplated that the above cases can be utilized jointly, with an additional index to indicate which case is utilized for the CU. As an example, Table 3 provides the syntax elements for the case 4 of combining affine mode and translational inter mode, in which gpm_affine_type _idx represents the prediction mode combination type of the two PUs.

TABLE 3

| | Descriptor |
|---|---|
| merge_data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( cbWidth < 128 && cbHeight < 128 && ( ( sps_ciip_enabled_flag && cu_skip_flag[ x0 ][ y0 ] = = 0 && ( cbWidth * cbHeight ) >= 64 ) \|\| ( sps_gpm_enabled_flag && sh_slice_type = = B && cbWidth >= 8 && cbHeight >= 8 && cbWidth < ( 8 * cbHeight ) && cbHeight < ( 8 * cbWidth ) ) ) ) | |
|         regular_merge_flag[ x0 ][ y0 ] | ae(v) |
|       if( regular_merge_flag[ x0 ][ y0 ] = = 1 ) { | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |

TABLE 3-continued

|  | Descriptor |
|---|---|
|           mmvd_distance_idx[ x0 ][ y0 ] | ae(v) |
|           mmvd_direction_idx[ x0 ][ y0 ] | ae(v) |
|         } else if( MaxNumMergeCand > 1 ) |  |
|           merge_idx[ x0 ][ y0 ] | ae(v) |
|     } else { |  |
|       if( sps_ciip_enabled_flag && sps_gpm_enabled_flag && sh_slice_type = = B && cu_skip_flag[ x0 ][ y0 ] = = 0 && cbWidth >= 8 && chHeight >= 8 && cbWidth < ( 8 * cbHeight ) && cbHeight < ( 8 * cbWidth ) && cbWidth < 128 && cbHeight < 128 ) |  |
|         ciip_flag[ x0 ][ y0 ] | ae(v) |
|       if( ciip_flag[ x0 ][ y0 ] && MaxNumMergeCand > 1 ) |  |
|         merge_idx[ x0 ][ y0 ] | ae(v) |
|         gpm_affine_flag[x0] [y0] | ae(v) |
|       ~~if( !ciip_flag[ x0 ][ y0 ] ) {~~ |  |
|       if(!ciip_flag[ x0 ][ y0 ] && !gpm_affine_flag[x0][y0]){ |  |
|         merge_gpm_partition_idx[ x0 ][ y0 ] | ae(v) |
|         merge_gpm_idx0[ x0 ][ y0 ] | ae(v) |
|         if( MaxNumGpmMergeCand > 2 ) |  |
|           merge_gpm_idx1[ x0 ][ y0 ] | ae(v) |
|       } |  |
|       else{ |  |
|         gpm_affine_type_idx | ae(v) |
|           merge_gpm_idx[ x0 ][ y0 ] | ae(v) |
|         merge_idx[ x0 ][ y0 ] | ae(v) |
|       } |  |
|       } |  |
|     } |  |
|   } |  |
| } |  |

In some scenarios, part of the CU may follow the affine motion while other part may be occluded which cannot be predicted well by inter prediction. To handle this situation effectively, as shown by the second example of FIG. 9(b), one partition is coded using affine mode and the other partition is coded with intra/IBC mode. Again, the affine mode can be selected from the affine AMVP mode, affine merge mode or affine MMVD mode. The intra/intra block copy (IBC) mode may be selected from the intra mode, IBC mode, and IBC merge mode. Accordingly, there are a total of six different combinations in the example of FIG. 9(c).

In the first example combination of FIG. 9(c), one PU in the CU is coded with affine AMVP mode and another PU is coded with intra mode. According to the prediction mode of each PU, there are two possible implementations for this combinations as follows:
- $PU_0$ is coded with affine AMVP mode and PU1 is coded with intra mode
- $PU_0$ is coded with intra mode and PU1 is coded with affine AMVP mode For the first combination, affine AMVP mode is applied for $PU_0$ and intra mode is applied for $PU_1$, and for the second combination, intra mode is applied for $PU_0$ and affine AMVP mode is applied for $PU_1$. If this case is selected for the current CU, then the pred_mode_combination_idx is signaled to indicate which combination is utilized. For the PU coded with affine AMVP mode, a flag is signaled to indicate 4-parameter or 6-parameter affine mode, followed by the inter prediction direction, reference index, CPMV difference and CMVP index.

In some implementations, for the PU coded with intra mode, there are several possible solutions:
a) Fixed intra mode like DC, planar or other intra mode is utilized for the PU
b) Intra mode is selected at the encoder by rate distortion optimization and the intra direction is signaled in the bitstream as has been done in the current VVC
c) Intra mode is inferred at the decoder through the direction of the partition line In the second example combination of FIG. 9(c), one PU in the CU is coded with affine AMVP mode and another PU is coded with IBC mode. According to the prediction mode of each PU, there are two possible implementations of this combination as follows:
- $PU_0$ is coded with affine AMVP mode and $PU_1$ is coded with IBC mode
- $PU_0$ is coded with IBC mode and $PU_1$ is coded with affine AMVP mode For the first combination, affine AMVP mode is applied for PU0 and IBC mode is applied for PU1, and for the second combination, IBC mode is applied for PU0 and affine AMVP mode is applied for PU1. If this case is selected for the current CU, then the pred_mode_combination_idx is signaled to indicate which combination is utilized. For the PU coded with affine AMVP mode, a flag is signaled to indicate 4-parameter or 6-parameter affine mode, followed by the inter prediction direction, reference index, CPMV difference and CMVP index. For the PU coded with IBC mode, then MVD and MVP index are signaled in the bitstream. Alternatively, the PU can be also coded with IBC merge mode and accordingly the merge index is signaled.

In the third example combination of FIG. 9(c), one PU in the CU is coded with affine merge mode and another PU is coded with intra mode. According to the prediction mode of each PU, there are two possible implementations for this combinations as follows:
- $PU_0$ is coded with affine merge mode and $PU_1$ is coded with intra mode
- $PU_0$ is coded with intra mode and $PU_1$ is coded with affine merge mode For the first combination, affine merge mode is applied for $PU_0$ and intra mode is applied for $PU_1$, and for the second combination, intra mode is applied for $PU_0$ and affine merge is applied for $PU_1$. If this case is selected for the current CU, then the pred_mode_combination_idx is signaled to indicate which combination is utilized. For the PU coded with affine merge mode, the affine merge index is signaled. In some implementations, for the PU coded with intra mode, there are several possible solutions.
  a) Fixed intra mode like DC, planar or other intra mode is utilized for the PU
  b) Intra mode is selected at the encoder by rate distortion optimization and the intra direction is signaled in the bitstream as has been done in the current VVC
  c) Intra mode is inferred at the decoder through the direction of the partition line In the fourth example combination of FIG. 9(c), one PU in the CU is coded with affine merge mode and another PU is coded with IBC mode. According to the prediction mode of each PU, there are two possible implementations for this combination as follows:
  $PU_0$ is coded with affine merge mode and $PU_1$ is coded with IBC mode
  $PU_0$ is coded with IBC mode and $PU_1$ is coded with affine merge mode For the first combination, affine merge mode is applied for $PU_0$ and IBC mode is applied for $PU_1$, and for the second combination, IBC mode is applied for $PU_0$ and affine merge is applied for $PU_1$. If this case is selected for the current CU, then the pred_mode_combination_idx is signaled to indicate which combination is utilized. For the PU coded with affine merge mode, the affine merge index is signaled. For the PU coded with IBC mode, then the MVD and MVP index are signaled. Alternatively, the PU can be also coded with IBC merge mode and accordingly the merge index is signaled.

In the fifth example combination of FIG. 9(c), one PU in the CU is coded with affine MMVD mode and another PU is coded with intra mode. According to the prediction mode of each PU, there are two possible implementations for this combination as follows:
  $PU_0$ is coded with affine MMVD mode and $PU_1$ is coded with intra mode
  $PU_0$ is coded with intra mode and $PU_1$ is coded with affine MMVD mode For the first combination, affine MMVD mode is applied for $PU_0$ and intra mode is applied for $PU_1$, and for the second combination, intra mode is applied for $PU_0$ and affine MMVD is applied for $PU_1$. If this case is selected for the current CU, then the pred_mode_combination_idx is signaled to indicate which combination is utilized. For the PU coded with affine MMVD mode, the affine MMVD candidate flag is signaled followed by the distance index and direction index. For the PU coded with intra mode, there are several possible solutions.
  a) Fixed intra mode like DC, planar or other intra mode is utilized for the PU
  b) Intra mode is selected at the encoder by rate distortion optimization and the intra direction is signaled in the bitstream as has been done in the current VVC
  c) Intra mode is inferred at the decoder through the direction of the partition line In the sixth example combination of FIG. 9(c), one PU in the CU is coded with affine MMVD mode and another PU is coded with IBC mode. According to the prediction mode of each PU, there are two possible implementations for this combination as follows:
  $PU_0$ is coded with affine MMVD mode and $PU_1$ is coded with IBC mode
  $PU_0$ is coded with IBC mode and $PU_1$ is coded with affine MMVD mode For the first combination, affine MMVD mode is applied for $PU_0$ and IBC mode is applied for $PU_1$, and for the second combination, IBC mode is applied for $PU_0$ and affine MMVD is applied for $PU_1$. If this case is selected for the current CU, then the pred_mode_combination_idx is signaled to indicate which combination is utilized. For the PU coded with affine MMVD mode, the affine MMVD candidate flag is signaled followed by the distance index and direction index. For the PU coded with IBC mode, then the MVD and MVP index are signaled. Alternatively, the PU can be also coded with IBC merge mode and accordingly the merge index is signaled.

For example, Table 4 is provided to describe the syntax elements of combining affine mode and intra mode, in which one PU is predicted with affine merge mode while the other PU is predicted with intra mode.

TABLE 4

| | Descriptor |
|---|---|
| merge_data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( cbWidth < 128 && cbHeight < 128 && ( ( sps_ciip_enabled_flag && cu_skip_flag[ x0 ][ y0 ] = = 0 && ( cbWidth * cbHeight ) >= 64 ) \|\| ( sps_gpm_enabled_flag && sh_slice_type = = B && cbWidth >= 8 && cbHeight >= 8 && cbWidth < ( 8 * cbHeight ) && cbHeight < ( 8 * cbWidth ) ) ) ) | |
|         regular_merge_flag[ x0 ][ y0 ] | ae(v) |
|       if( regular_merge_flag[ x0 ][ y0 ] = = 1 ) { | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |

TABLE 4-continued

|  | Descriptor |
|---|---|
|     } else if( MaxNumMergeCand > 1 ) | |
|       merge_idx[ x0 ][ y0 ] | ae(v) |
|   } else { | |
|     if( sps_ciip_enabled_flag && sps_gpm_enabled_flag && | |
| sh_slice_type = = B && cu_skip_flag[ x0 ][ y0 ] = = 0 && cbWidth >= | |
| 8 && cbHeight >= 8 && cbWidth < ( 8 * cbHeight ) && cbHeight < | |
| ( 8 * cbWidth ) && cbWidth < 128 && cbHeight < 128 ) | |
|       ciip_flag[ x0 ][ y0 ] | ae(v) |
|     if( ciip_flag[ x0 ][ y0 ] && MaxNumMergeCand > 1 ) | |
|       merge_idx[ x0 ][ y0 ] | ae(v) |
|       gpm_affine_flag[x0][y0] | ae(v) |
|     ~~if( !ciip_flag[ x0 ][ y0 ] ){~~ | |
|     if(!ciip_flag[ x0 ][ y0 ] && !gpm_affine_flag[x0][y0]){ | |
|       merge_gpm_partition_idx[ x0 ][ y0 ] | ae(v) |
|       merge_gpm_idx0[ x0 ][ y0 ] | ae(v) |
|       if( MaxNumGpmMergeCand > 2 ) | |
|         merge_gpm_idx1[ x0 ][ y0 ] | ae(v) |
|     } | |
|     else{ | |
|       gpm_affine_type_idx | ae(v) |
|         merge_gpm_idx[ x0 ][ y0 ] | ae(v) |
|       intra_dir[ x0 ][ y0 ] | ae(v) |
|     } | |
|     } | |
|   } | |
| } | |
| } | |

In some implementations, information indicating the geometry partition affine motion prediction mode is encoded in a bitstream. For example, the flag signaled at the CU level to indicate the geometry affine mode, the index pred_mode_combination_idx indicating the particular combination of motion prediction modes used for the partitions in the CU, and other flags and indices signaled to indicate the motion information of the partitions or parameters defining the motion prediction modes.

In step 808, the video processor may blend samples of the first partition coded with the first motion prediction mode and samples of second partition coded with second motion prediction mode along the geometric partition line. In some implementations, based on the motion information of both partitions, two predicted blocks may be obtained using their own motion compensation modes in step 804. Then the final predicted block of the current CU can be generated using a blending operation applied to the two uni-prediction signals to derive samples around geometric partition line. Blending may be performed based on weights assigned to the respective samples. The blending weights for the samples of the CU are derived based on the distance from each individual sample position to the corresponding partition line. In some implementations, the weights in the blending operation are determined based on the angle and offset of the partition line used in the GPM.

Figure 10:
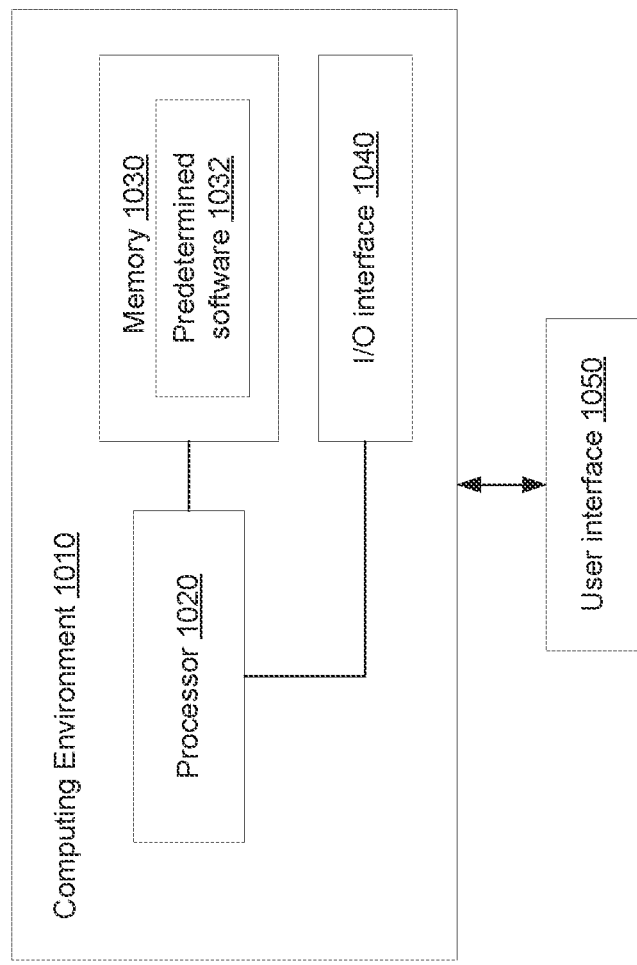
FIG. 10 is a graphical representation illustrating a computing environment coupled with a user interface in accordance with some implementations of the present disclosure.

FIG. 10 shows a computing environment 1010 coupled with a user interface 1050, according to some implementations of the present disclosure. The computing environment 1010 can be part of a data processing server. The computing environment 1010 includes a processor 1020, a memory 1030, and an Input/Output (I/O) interface 1040.

The processor 1020 typically controls overall operations of the computing environment 1010, such as the operations associated with display, data acquisition, data communications, and image processing. The processor 1020 may include one or more processors to execute instructions to perform all or some of the steps in the above-described methods. Moreover, the processor 1020 may include one or more modules that facilitate the interaction between the processor 1020 and other components. The processor 1020 may be a Central Processing Unit (CPU), a microprocessor, a single chip machine, a Graphical Processing Unit (GPU), or the like.

The memory 1030 is configured to store various types of data to support the operation of the computing environment 1010. The memory 1030 may include predetermined software 1032. Examples of such data includes instructions for any applications or methods operated on the computing environment 1010, video datasets, image data, etc. The memory 1030 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1040 provides an interface between the processor 1020 and peripheral interface modules, such as a keyboard, a click wheel, buttons, or the like. The buttons may include but are not limited to, a home button, a start scan button, and a stop scan button. The I/O interface 1040 can be coupled with an encoder and decoder.

In some implementations, there is also provided a non-transitory computer-readable storage medium comprising a plurality of programs, for example, in the memory 1030, executable by the processor 1020 in the computing environment 1010, for performing the above-described methods. Alternatively, the non-transitory computer-readable storage medium may have stored therein a bitstream or a data stream comprising encoded video information (for example, video information comprising one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device comprising one or more processors (for example, the processor 1020); and the non-transitory computer-readable storage medium or the memory 1030 having stored therein a plurality of programs executable by the one or more processors, wherein the one or more processors, upon execution of the plurality of programs, are configured to perform the above-described methods.

In some implementations, there is also provided a computer program product comprising a plurality of programs, for example, in the memory 1030, executable by the processor 1020 in the computing environment 1010, for performing the above-described methods. For example, the computer program product may include the non-transitory computer-readable storage medium.

In some implementations, the computing environment 1010 may be implemented with one or more ASICs, DSPs, Digital Signal Processing Devices (DSPDs), Programmable Logic Devices (PLDs), FPGAs, GPUs, controllers, microcontrollers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video coding method for motion compensation prediction, comprising:
   performing, by a processor, a geometry partition on a video block of a video frame from a video to obtain a first partition and a second partition; and
   applying, by the processor, a first motion prediction mode to the first partition and a second motion prediction mode to the second partition,
   wherein the first motion prediction mode is an affine motion prediction mode and the second motion prediction mode is a translation motion prediction mode or an intra/IBC mode, or the first motion prediction mode is a translation motion prediction mode or an intra/IBC mode and the second motion prediction mode is an affine motion prediction mode,
   wherein the video coding method further comprises:
   signaling a prediction mode combination index to indicate a combination of the affine motion prediction mode applied to the first partition and the translation motion prediction mode or the intra/IBC mode applied to the second partition.

2. The video coding method of claim 1, further comprising: signaling a flag of the video block to indicate a geometry affine mode.

3. The video coding method of claim 1, wherein the first motion prediction mode or the second motion prediction mode is one of an affine AMVP mode, an affine merge mode and an affine MMVD mode,
   wherein the video coding method further comprises:
   signaling a prediction mode combination index to indicate a combination of the first motion prediction mode applied to the first partition and the second motion prediction mode applied to the second partition.

4. The video coding method of claim 1, wherein the first motion prediction mode is one of an affine AMVP mode, an affine merge mode and an affine MMVD mode, and wherein the second motion prediction mode is one of a regular AMVP mode, a regular merge mode, a regular MMVD mode, and an inter TM/BM merge mode, or the second motion prediction mode is one of an intra mode, an IBC mode, and an IBC merge mode.

5. The video coding method of claim 1, further comprising:
   generating a final predicted block of the video block by blending samples of the first partition coded with the first motion prediction mode and samples of the second partition coded with the second motion prediction mode along a geometric partition line between the first partition and the second partition.

6. The video coding method of claim 5, further comprising:
   determining respective blending weights for the samples to be blended based on an angle and an offset of the geometric partition line and respective distances between the samples and the geometry partition line;
   and wherein the video block is a coding unit (CU).

7. A video coding apparatus for motion compensation prediction, comprising:
   a memory configured to store at least one video frame of a video, the video frame comprising at least one video block; and
   a video processor configured to:
   perform a geometry partition on a video block of a video frame from the video to obtain a first partition and a second partition; and
   apply a first motion prediction mode to the first partition and a second motion prediction mode to the second partition,
   wherein the first motion prediction mode is an affine motion prediction mode and the second motion prediction mode is a translation motion prediction mode or an intra/IBC mode, or the first motion prediction mode is a translation motion prediction mode or an intra/IBC mode and the second motion prediction mode is an affine motion prediction mode,
   wherein the video coding method further comprises:
   signaling a prediction mode combination index to indicate a combination of the affine motion prediction mode applied to the first partition and the translation motion prediction mode or the intra/IBC mode applied to the second partition.

8. The video coding apparatus of claim 7, wherein the video processor is further configured to signal a flag of the video block to indicate a geometry affine mode.

9. The video coding apparatus of claim 7, wherein the first motion prediction mode or the second motion prediction mode is one of an affine AMVP mode, an affine merge mode and an affine MMVD mode, wherein the video processor is further configured to:
signal a prediction mode combination index to indicate a combination of the first motion prediction mode applied to the first partition and the second motion prediction mode applied to the second partition.

10. The video coding apparatus of claim 7, wherein the first motion prediction mode is one of an affine AMVP mode, an affine merge mode and an affine MMVD mode.

11. A non-transitory computer-readable storage medium having stored therein instructions and a bitstream, when the instructions executed by a video processor, cause the video processor to perform a video coding method for motion compensation prediction to generate the bitstream, comprising:

performing a geometry partition on a video block of a video frame from a video to obtain a first partition and a second partition;

applying a first motion prediction mode to the first partition and a second motion prediction mode to the second partition to obtain a coded video block, wherein the first motion prediction mode is an affine motion prediction mode and the second motion prediction mode is a translation motion prediction mode or an intra/IBC mode, or the first motion prediction mode is a translation motion prediction mode or an intra/IBC mode and the second motion prediction mode is an affine motion prediction mode, wherein the video coding method further comprises:

signaling a prediction mode combination index to indicate a combination of the affine motion prediction mode applied to the first partition and the translation motion prediction mode or the intra/IBC mode applied to the second partition; and generating a bitstream comprising the coded video block, wherein the bitstream is stored in the non-transitory computer-readable storage medium.

12. The non-transitory computer-readable storage medium of claim 11, wherein the video coding method further comprises:

generating a flag of the video block to indicate a geometry affine mode and including the flag in the bitstream.

* * * * *